G. E. EDWARDS.
PULLEY LINE TAKE-UP.
APPLICATION FILED JUNE 13, 1918.
1,293,384.
Patented Feb. 4, 1919.
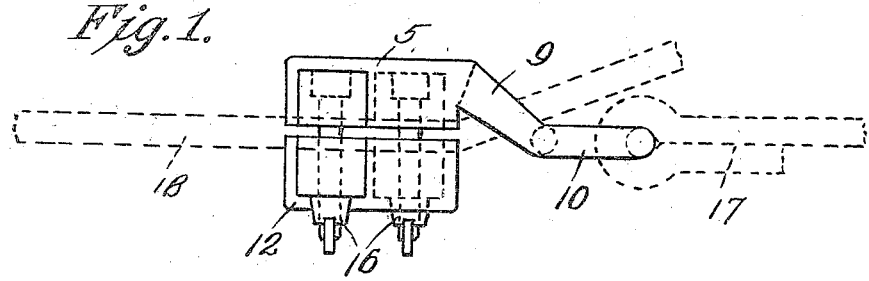
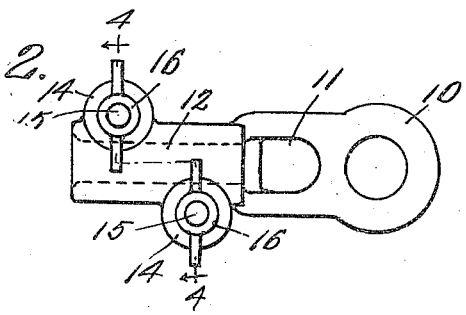
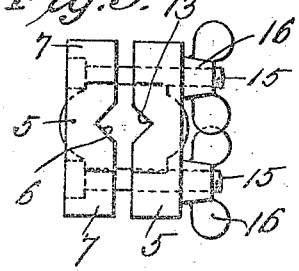
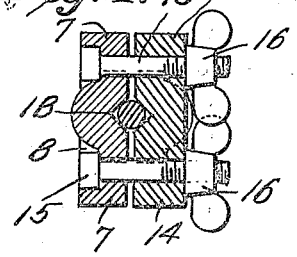
WITNESSES
James F. Crown,
H. B. Vrooman
INVENTOR
George E. Edwards,
BY Richard Bowen,
ATTORNEY

UNITED STATES PATENT OFFICE.

GEORGE E. EDWARDS, OF WATERBURY, CONNECTICUT.

PULLEY-LINE TAKE-UP.

1,293,384.　　　　　Specification of Letters Patent.　　　Patented Feb. 4, 1919.

Application filed June 13, 1918.　Serial No. 239,824.

*To all whom it may concern:*

Be it known that I, GEORGE E. EDWARDS, a citizen of the United States, residing at Waterbury, in the county of New Haven and State of Connecticut, have invented certain new and useful Improvements in a Pulley-Line Take-Up, of which the following is a specification.

This invention is a pulley line takeup and has for its principal object the production of efficient means for retaining the end portions of the line in adjusted condition.

Another object of this invention is the production of a pulley line takeup wherein the device includes a pair of clamping sections which engage the free ends of the line and hold the same in a taut position.

Another object of this invention is the production of a pulley line takeup wherein the sections are provided with grooves through which the line which is taken up extends, while an extension projects through one of the sections, whereby one end of the line may be permanently secured thereto, while the remaining end extends therethrough, while the ends of the line are in direct alinement, due to the particular angle the extension projects in.

Broadly stated, the invention consists of a primary section and an auxiliary section, said sections having grooves formed therein, thus permitting a line to be gripped within the grooves, bosses formed on said sections, an extension projecting from one section, said extension having bosses extending diagonally to the extension on which the same is formed, the section terminating in a portion projecting in alinement with the grooved portions of the sections, the angular portion being provided with an opening, whereby a line may extend through the opening after being clamped between the grooves, while the other end of the line may be in alinement with the grooves.

One practical form of construction and assembly of the present invention will be hereinafter described and is illustrated in the accompanying drawing, in which:—

Figure 1 is a side elevation of the device showing the two sections assembled.

Fig. 2 is a bottom plan view of the device.

Fig. 3 is an end elevation of the same, and

Fig. 4 is a section taken on the line 4—4 of Fig. 2.

In the preferred embodiment of the present invention about to be described, it will be seen that the primary section 5 is provided with a longitudinally extending groove 6 formed therein which is V-shaped in cross section, as shown in Figs. 3 and 4. This primary section 5 is elongated and has bosses 7 formed on its side portions and adjacent opposite ends thereof. These bosses 7 are provided with sockets 8, as shown in Fig. 4.

The extension 9 is formed integral upon the primary section 5 at one end thereof, as shown in Figs. 1 and 2 and projects diagonally with respect to the longitudinal axis of the primary section 5. This extension terminates in an eye 10 formed integral thereon and projecting at an oblique angle thereto, whereby the eye 10 will extend in the same direction as the longitudinal axis of the primary section 5. By referring to Fig. 2 it will be noted that the extension 9 is provided with an opening 11, extending toward the eye 10, and for this reason the opening 11 will be in a plane extending parallel to the groove 6 of the primary section 5, while the eye 10 will be in direct alinement with the grooves.

The auxiliary section 12 is somewhat similar in construction to the primary section 5 and this auxiliary section 12 is provided with a groove 13, which is in direct alinement with the groove 6 of the primary section when the device is in use. This auxiliary section is also provided with bosses 14 upon its side edges and adjacent its ends, as shown in Fig. 2.

When the device is in use, the auxiliary section is placed in alinement with the primary section and at this time, the bolts 15 are passed through the bosses 7 of the primary section and 14 of the auxiliary section. The heads of the bolts 15 rest within the sockets 8 of the primary section, although the ends of the bolts project beyond the outer surface of the auxiliary section and carry winged nuts 16. The cable end 17 indicated in dotted lines in Fig. 1 is permanently secured to the eye 10 and for this reason is in direct alinement with the central portion of the take up device. The cable end 18 is brought between the primary and auxiliary sections and fits within the grooves 6 and 13. Therefore, when the nuts 16 are tightened upon the bolts 15, the two sections will be urged toward each other into binding engagement with the cable end 18 extending therebetween and resting within the grooves 6 and 13, thus bringing the two sections into a binding engagement with the cable and preventing the displacement of the cable and the slipping of the takeup device thereon. The end of the cable may be extended through the opening 11 formed in the diagonal extension 9 and for this reason the cable will not bind but may extend beyond the device without interfering with the operation of the same. The cable end 18 secured between the two sections is in direct alinement with the eye 10 and as the cable end 17 is connected to this eye, it is obvious that a direct pull will be imparted through the takeup device, due to the alined arrangement of the retaining devices for the cable ends. It will also be noted that by having the heads of the bolts carried in sockets 8, there is no tendency of the heads being accidentally struck and the bolts being loosened and it is obvious that the sections may be tightened when desired upon the cable ends extending within the grooves.

The foregoing description and the drawings have reference to what may be considered the preferred, or approved, form of my invention. It is to be understood that I may make such changes in construction and arrangement and combination of parts, material, dimensions, et cetera, as may prove expedient and fall within the scope of the appended claims.

Having thus fully described my invention, what I claim as new and desire to secure by Letters Patent, is:—

1. In a device of the class described, the combination of a primary section and an auxiliary section, means for urging said sections toward each other, an extension projecting from one of said sections and terminating in an eye, said eye extending at an oblique angle to the extension, whereby one end of the cable may be permanently secured to said eye in direct alinement with the end of the device, while the remaining end of the cable may be clamped between said sections.

2. In a device of the class described, the combination of an elongated comparatively flat primary section, an elongated comparatively flat auxiliary section carried adjacent the primary section, means for urging said sections toward each other, said sections being unobstructed at their ends, an extension projecting from one end of the primary section and slanting to terminate in direct alinement with the space between the sections, an eye formed upon the end of the extension, said eye extending at an oblique angle to the extension, thus being in direct alinement with the space between the sections, the said extension having an opening formed therethrough, whereby a cable end may be permanently connected to the eye so that the pull upon the eye will be central with the two sections, while the remaining end of the cable may be bound between the sections and then projected through the opening in said extension.

In testimony whereof I affix my signature in presence of two witnesses.

GEORGE E. EDWARDS

Witnesses:
GEORGE A. BARONIAN,
CLAYTON A. TYLER.